UNITED STATES PATENT OFFICE.

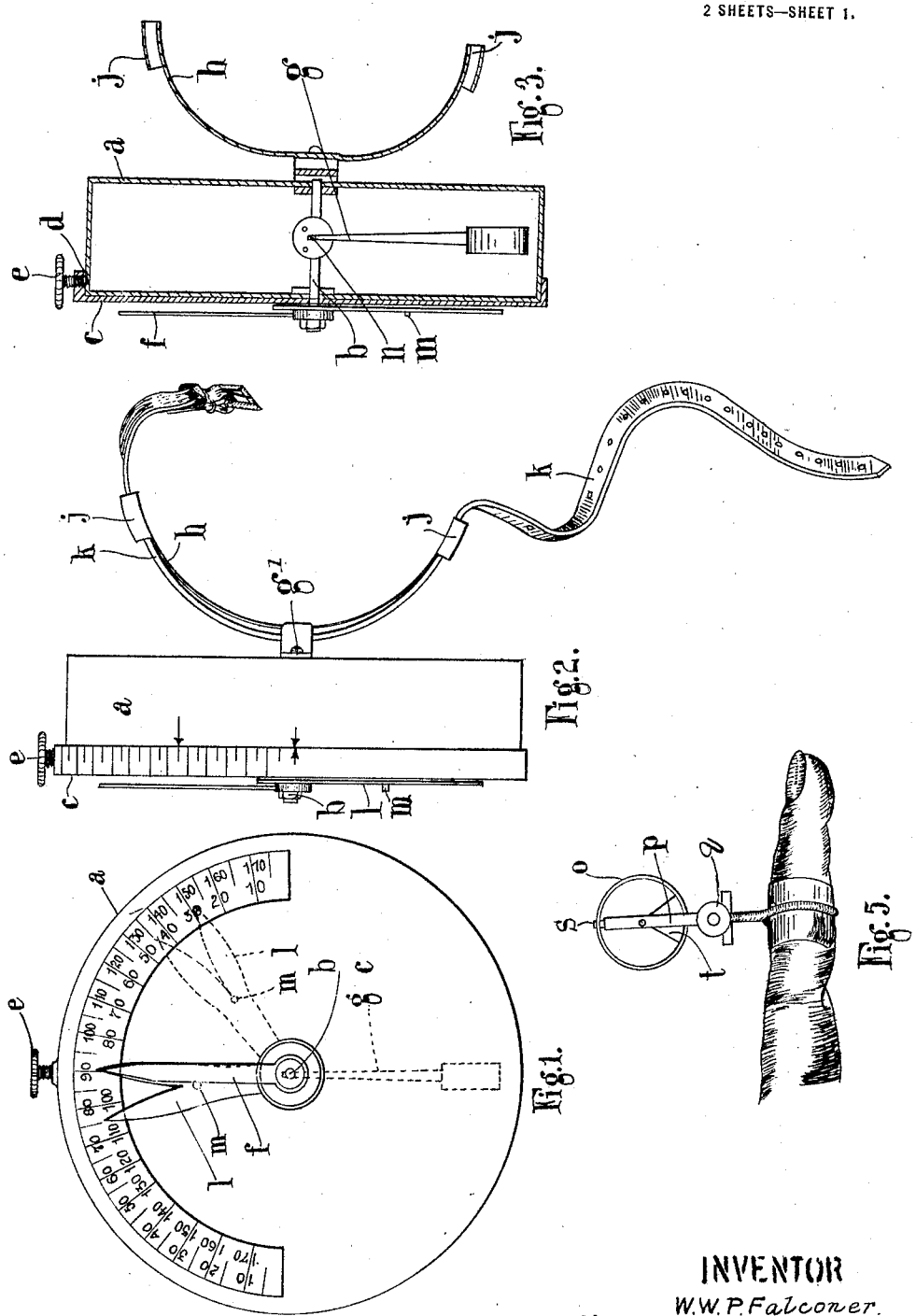

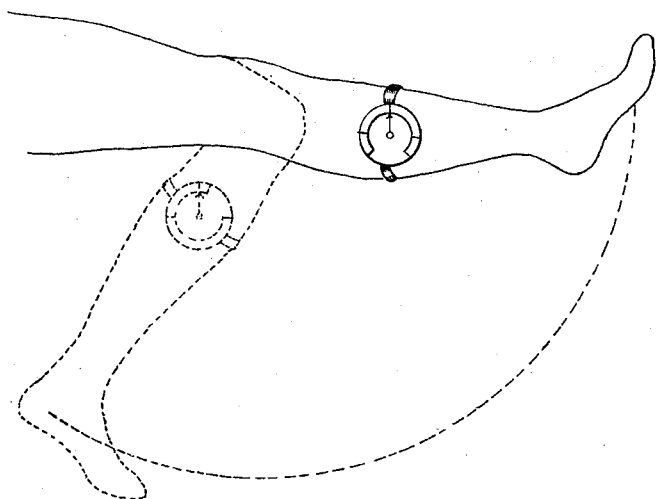
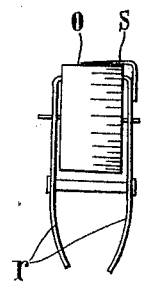
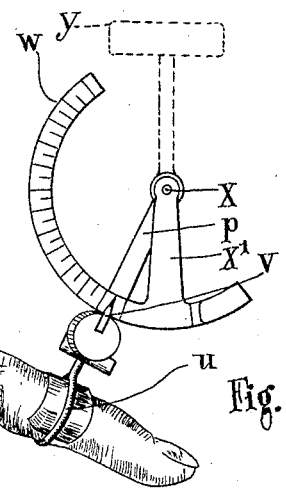
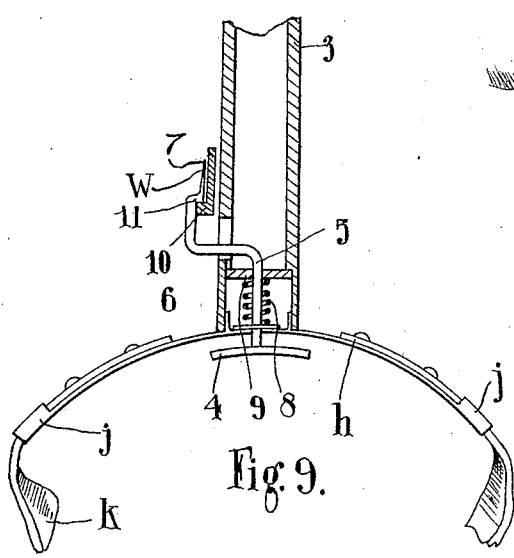
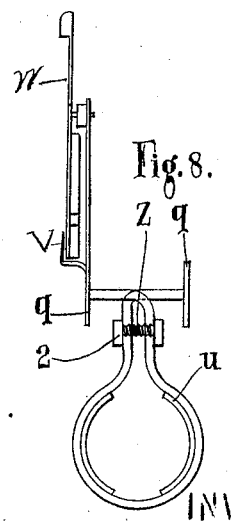

WILLIAM WILBRAHAM PHILLIPS FALCONER, OF LONDON, ENGLAND.

DEVICE FOR MEASURING THE RANGE OF MOVEMENT OF HUMAN JOINTS.

1,401,146. Specification of Letters Patent. Patented Dec. 27, 1921.

Application filed March 26, 1919. Serial No. 285,204.

*To all whom it may concern:*

Be it known that I, WILLIAM WILBRAHAM PHILLIPS FALCONER, a subject of the King of Great Britain and Ireland, and residing at 16 Oppidans road, London, N. W. 3, England, have invented a certain new and useful Device for Measuring the Range of Movement of Human Joints, of which the following is a specification.

This invention relates to devices for instruments for measuring the range or degree of the angle of movement of human joints, particularly of those which are disabled, so that the progress of cure may be measured or recorded, for instance, to indicate the extent of movement of the wrist joint, the shoulder, elbow, knee, ankle joints and so forth.

In devices that have been used hitherto for this purpose, it has been necessary to use a special instrument (e. g. goniometer, fleximeter) for each joint in order that it might be fitted in position. Thus, with the knee joint, for instance, a pair of plates respectively fitting the thigh and calf are pivoted together, with a moving indicator attached to one or the other member to coöperate with a fixed and graduated index, but another form of instrument must, however, be used for the wrist. Besides the defect that displacement is liable to occur during the flexion of the limbs, such devices also possess the disadvantage that the patient has to maintain the limb at its extreme range of movement while the graduation is recorded, and it often happens, owing to the position of the limb and joint, that it is not easy to either record or verify the angle indicated.

It has also been proposed to attach a spirit level to the finger of a workman to show that the material he is laying is vertical or horizontal.

The object of the present invention is a simple form of instrument that will be capable of application to any and every joint, and in which any indication given by the instrument is maintained for any period so that the instrument may be removed if necessary for verifying and recording the particular angle of movement that has been reached.

The invention consists in adapting the principle of gravity to operate a movable solid or liquid indicator to register with a series of graduation marks as the limbs of a particular joint are flexed, extended or rotated.

The invention also consists in combining with such a gravity operated indicator, means such that when the limbs resume the normal position, although the gravity operated member returns, the movable indicator remains in the position to which it has been adjusted, so that after the record is verified, it may be set back to zero.

The invention will now be described with reference to the accompanying drawings, in which:—

Figures 1 and 2 are a front view and side view respectively of one form of indicator.

Fig. 3 is a side sectional elevation.

Fig. 4 is a view of the device when used for measuring the movement of the knee joint.

Fig. 5 is an elevation of a modified form of instrument as used for the finger.

Fig. 6 is a side view of Fig. 5 and showing a modified form of finger mount.

Figs. 7 and 8 are respectively a side elevation and end view of a further modified form of the device as used on the finger; and Fig. 9 is a detail of a locking device hereinafter described.

In carrying the invention into effect according to Figs. 1 and 2, it is explained that these indicate two forms of appliances, viz: in which a single index finger is used, and that in which two index fingers are used. In both forms there is provided a flat circular casing $a$ in the center of which an arbor $b$ is mounted, its front end projecting beyond one face or side of the casing $a$ and upon this projecting end an indicating dial $c$ is loosely mounted. The edge of the dial $c$ is flanged at $d$ to slip loosely upon one side of the casing $a$ and in order that it may be secured in a definite position thereon, a binding screw $e$ is provided. The front of the dial is graduated in a manner similar to that of a protractor so as to show the degrees of a circle, half the circumference of a circle being shown. As movement may occur to the left or right, two sets of numbers, extending in reverse direction, are provided, the normal position of the pointer in each case being at 90°. If desired, however, the normal position of the pointer may be at 0°, in which case the numbers will extend therefrom in either direction. Co-acting with the graduations is provided a pointer or finger $f$ which is carried by the outer end of the arbor preferably by a squared part thereof, and is maintained constantly upright by a weighted arm $g$ which is suspended from that part of the arbor which is within the casing. The back of such casing is fitted with a clip $g'$ to which is secured a curved holder $h$ having loops $j$ at the end through which is guided a strap $k$ by which the device is firmly mounted upon the limb or joint, the range of the angle of movement of which it is desired to ascertain. The strap is of minimum width consistent with security in order to prevent a possible dragging effect when flexing the limb, from displacing the instrument.

In using the instrument as applied, for example to the knee joint, as shown in Fig. 4, it is strapped to the leg, the graduations on the dial, in this case, being shown for example, as extending approximately for three quarters of a circle. As the leg is swung down to the dotted position, the dial swings around relatively to the pointer which indicates at the completion of the movement the change of angle, in this instance about 125°.

It will be understood that the dial is, as described above, movable relatively to the casing $a$ when the binding screw is released, and such a circular adjusting movement of the dial may be necessary in order to accurately set the dial with the normal, more or less vertical, position of the indicating pointer $f$. A greater range of movement may, however, be necessary when the instrument is to be attached in special ways to the limbs, and in order that such adjustment may be regulated, the side of flange $c$ of the dial may bear graduations which register with an index mark or marks on the stationary part of the casing.

From that which is described above it will be understood that when the limb returns to its normal position, the dial will also return to the zero position, so that it is necessary to verify the angle which is moved through by the limb when it is being flexed at the moment when the flexing movement ends. Such a momentary verification may not always be convenient, and therefore, in order to furnish a more permanent verification or record, the instrument may be provided, as shown in Figs. 1 and 2 with a second pointer $l$ which is mounted on the arbor $b$ with sufficient friction so that it will normally tend to move with the arbor. The pointer $l$ is provided with a projecting pin $m$ which is adapted to make contact with one side or the other of the pointer $f$ according to whether the movement will occur in a left-hand or a right-hand direction. In the full line position of the pointer $l$ shown in Fig. 1, when the instrument is going to be used, for example, in the manner shown in Fig. 4, the dial moves relatively to the pointed $f$, but the pointer $l$ in its tendency to move with the arbor $b$ is pushed back by the pin $m$ contacting with the pointer $f$ that remains stationary. The weight of the pointer $f$ is sufficient to overcome the friction by which the pointer $l$ is held upon the arbor $b$, so that the right-hand prong of the pointer $l$ will indicate at the end of the movement, the amount of swing that has occurred, but when the limb returns, the secondary pointer $l$ will be left behind, but the dial with the pointer $f$ will resume their zero position. The purpose of forming the pointer $l$ with two prongs is to permit of the movement in either direction to the left or to the right, the pointer being swung around by hand so that its pin $m$ will engage that side of the pointer $f$ in which the swing of the dial will occur. In order to clearly show the form of this pointer, it is shown displaced in dotted lines.

Referring to Fig. 3, the weighted arm $g$ is provided with a pivoted connection at its upper end indicated at $n$, so that it can maintain a truly perpendicular position should it be necessary to fix the instrument or the casing $a$ slightly obliquely. Referring to Figs. 5, 6, 7 and 8, modified forms of the instrument are shown in order to adapt it for measuring the range of the angle of movement of a finger joint. As shown in in Figs. 5 and 6, the indicating dial is formed as a hollow cylinder $o$, upon the periphery of which the usual graduations are provided, the cylinder being carried upon trunnion-like bearings formed by a frame $p$. In the case of Fig. 5, this frame $p$ comprises a spring loop with crossed-over ends, such ends being formed with disk-like portions $q$, (one of which is shown), that may be gripped between the thumb and the finger in order to open the loop so that the finger may be inserted therein. In Fig. 6 the loop is replaced by a pair of spring extensions $r$ which are adapted to be forced apart to fit over the finger. In order to indicate the angles, the upper end of the frame $p$ is bent over to form a finger or pointer $s$, and in order that the cylindrical member $o$ will be under the influence of gravity, it is weighted as shown at $t$.

Referring to Figs. 7 and 8, the frame comprises a spring loop $u$ as before described, and one of the disk-like portions $q$ is extended to form a pointer $v$ adapted to register with a swinging graduated quadrant $w$ suspended by means of a radius bar $x'$, from the axle or arbor $x$ supported by the upper end of the frame $p$ which is formed integrally with the upper end of the loop $u$. The radius bar is formed massive so that it acts as a weight upon the quadrant $w$. As shown in Fig. 7, the quadrant is swung slightly out of the center line. If desired, a handle y, shown in dotted lines, may be used for conveniently carrying the device. In order to adjust the grip of the spring loop u, and thus prevent it from gripping the limb to which it is attached too tightly, one of its upper ends may carry an adjusting screw z, the end of which presses upon a lug 2, projecting from the upper end of the other limb of the loop as shown in Fig. 8.

The modifications referred to in the above figures render it necessary to immediately verify the angle at the end of the flexing movement, no provision being made for positively recording the angle of flexion, but such a modification is shown in Fig. 9 in which a form of instrument is shown, having a clip and strap similar to that in Fig. 3. In this instance a quadrant member such as w would be suspended from a stem 3 similar in operation to that in Fig. 7, and in order that the flexion angle may be positively recorded, the grooved holder h is provided with a pressure plate or trigger 4, attached to a pin 5 which is arranged to pass centrally into the base of the stem and is then formed with a loop to pass through a suitable opening 6 in the stem, which extending part is then bent upward to form a pointer 7 adapted to register with the swinging quadrant w, carrying the usual graduations. The arrangement is such that by means of a coiled spring 8 surrounding the lower end of the stem 5, such spring being secured between a washer 9 in the stem and a corresponding washer on the shaft 5, when the instrument is applied in position, the pressure produced upon the trigger plate 4 will release the quadrant and permit it to swing free. For this purpose the outer edge of the quadrant has a projecting flange 10, engaging with a shoulder 11, at the base of the pointer 7. When the desired flexing movement has taken place, the instrument may be removed and the act of removing it will cause the parts 10 and 11 to engage one another by the expansion of spring 8, so that the quadrant will be thereby prevented from swinging and thus afford a positive indication of the flexion angle.

It is also to be understood that the instrument may take various sizes, and if desired, may be as small as a watch and the latter size adapting the instrument for recording very small movements, such as for instance, finger movements. Such a size of instrument would enable the instrument to be carried conveniently in the waistcoat pocket. Moreover the instrument may be combined with other and suitable attachments when the particular kind of movement which it is desired to measure or record render such necessary. For example, in head, trunk or hand movements and the like.

Having now described my invention, what I claim as new and desire to secure by Letters Patent is:—

1. A device for indicating the range of angle of movement of human joints and adapted to be attached to a human limb in such a manner as not to cause injury thereto comprising in combination an indicator graduated so as to indicate the degrees of an arc or circle such indicator being flanged to fit upon a casing in the center of which an arbor is supported, a weighted arm suspended in the casing from the said arbor, and a pointer adapted to register with the graduations of the indicator and keyed to a portion of the arbor which projects beyond the face of the casing.

2. A device for indicating the range of angle of movement of human joints and adapted to be attached to a human limb in such a manner as not to cause injury thereto comprising in combination an indicator graduated so as to indicate the degrees of an arc or circle, such indicator being flanged to fit upon a casing, adapted to be adjusted relatively to the casing for the purpose of setting the indicator in the normal position and means for locking the indicator and casing together, an arbor supported in the center of the casing, a weighted arm suspended in the casing and from the said arbor, a pointer adapted to register with the graduations of the indicator and keyed to a portion of the arbor which projects beyond the face of the casing.

3. A device for indicating the range of angle of movement of human joints and adapted to be attached to a human limb in such a manner as not to cause injury thereto comprising in combination an indicator graduated so as to indicate the degrees of an arc or circle, such indicator being flanged to fit upon a casing in the center of which an arbor is supported, a weighted arm suspended in the casing from the said arbor, a pointer adapted to register with the graduations of the indicator and to indicate the amount of flexion of the limb, such pointer being keyed to a portion of the arbor which projects beyond the face of the casing, and an additional pointer adapted to remain in the position indicating the maximum flexion of the limb upon the limb being returned to normal position such additional pointer being frictionally mounted upon the arbor, the first pointer being adapted to drive the other preferably by means of a pin projecting therefrom or otherwise.

4. A device for indicating the range of angle of movement of human joints and adapted to be attached to a human limb in such a manner as not to cause injury thereto comprising in combination an indicator graduated so as to indicate the degrees of an arc or circle, such indicator being flanged to fit upon a casing in the center of which an arbor is supported, a weighted arm suspended in the casing from the said arbor, a pointer adapted to register with the graduations of the indicator and to indicate the amount of flexion of the limb, such pointer being keyed to a portion of the arbor which projects beyond the face of the casing, and an additional pointer adapted to remain in the position indicating the maximum amount of flexion of the limb upon the limb being returned to normal position, such additional pointer being frictionally mounted upon the arbor and being provided with two prongs one or the other of which registers with the first mentioned pointer according as to whether its movement is to the right or the left relatively to the indicator.

5. A device for indicating the range of angle of movement of human joints comprising in combination a casing, an indicator graduated so as to indicate the degrees of an arc or circle, such indicator being flanged to fit upon the aforementioned casing, an arbor supported in the center of the casing, a weighted arm suspended in the casing from the said arbor, said weighted arm being adapted to swing in two directions, such two directions being relatively at right angles to each other.

6. A device for indicating the range of angle of movement of human joints comprising in combination a casing, an indicator graduated so as to indicate the degrees of an arc or circle, such indicator being flanged to fit upon a casing, the pointer adapted to register with the graduations of such indicator, gravity influenced means whereby relative movement is caused between the indicator and pointer upon the flexing of a limb to which the device is attached, a clip attached to the casing, a holder secured to such clip and having its ends free, such ends being made in the form of loops, and a strap passing through the said loops and engaging with the aforesaid holder for the purpose described.

In testimony whereof I have signed my name to this specification.

WILLIAM WILBRAHAM PHILLIPS FALCONER.